US008102972B2

(12) United States Patent
Poremba

(10) Patent No.: US 8,102,972 B2
(45) Date of Patent: Jan. 24, 2012

(54) EMERGENCY SERVICES SELECTIVE ROUTER INTERFACE TRANSLATOR

(75) Inventor: Todd Poremba, Seattle, WA (US)

(73) Assignee: TeleCommunication Systems, Inc., Annapolis, MD (US)

(*) Notice: Subject to any disclaimer, the term of this patent is extended or adjusted under 35 U.S.C. 154(b) by 491 days.

(21) Appl. No.: 12/457,274

(22) Filed: Jun. 5, 2009

(65) Prior Publication Data

US 2010/0074418 A1 Mar. 25, 2010

Related U.S. Application Data

(60) Provisional application No. 61/129,108, filed on Jun. 5, 2008.

(51) Int. Cl.
*H04M 11/04* (2006.01)
(52) U.S. Cl. ......................................................... 379/45
(58) Field of Classification Search ...................... 379/45
See application file for complete search history.

(56) References Cited

U.S. PATENT DOCUMENTS

| | | | |
|---|---|---|---|
| 5,712,900 A | 1/1998 | Maupin |
| 5,937,344 A | 8/1999 | Zicker |
| 6,134,316 A | 10/2000 | Kallioniemi |
| 6,275,937 B1 | 8/2001 | Hailpern |
| 6,321,092 B1 | 11/2001 | Fitch |
| 6,330,313 B1 | 12/2001 | Hunt |
| 6,526,026 B1 | 2/2003 | Menon |
| 6,587,691 B1 | 7/2003 | Granstam |
| 6,795,444 B1 | 9/2004 | Vo |
| 6,898,274 B1 | 5/2005 | Galt |
| 6,985,747 B2 | 1/2006 | Chithambaram |
| 7,031,724 B2 | 4/2006 | Ross |
| 7,106,717 B2 | 9/2006 | Rousseau |
| 7,177,397 B2 | 2/2007 | McCalmont |
| 7,177,399 B2 | 2/2007 | Dawson |
| 7,330,899 B2 | 2/2008 | Wong |
| 7,436,785 B1 | 10/2008 | McMullen |
| 2002/0055924 A1 | 5/2002 | Liming |
| 2002/0099802 A1 | 7/2002 | Marsh |
| 2002/0118650 A1 | 8/2002 | Jagadeesan |
| 2002/0123354 A1 | 9/2002 | Nowak |
| 2002/0154221 A1 | 10/2002 | Ishimaru |
| 2003/0012148 A1 | 1/2003 | Peters |

(Continued)

OTHER PUBLICATIONS

International Search Report issued in PCT/US2009/002752, dated Jul. 6, 2009.

(Continued)

*Primary Examiner* — Creighton Smith
(74) *Attorney, Agent, or Firm* — William H. Bollman

(57) ABSTRACT

A selective router interface translator for placement between legacy selective routers and their location databases translates location queries from legacy selective router interfaces to newer protocol location databases using newer protocol interfaces, e.g., a NENA V8 protocol query to an Emergency Routing DataBase (ERDB), or a Location to Service Translation (LoST) protocol query to a LoST server. In this way existing selective routers may remain as they are today, yet be flexible enough to allow the databases they query to be developed to new standards. The disclosed selective router interface translator includes a NENA V3 protocol to LoST protocol translator to translate a NENA V3 query for location of an emergency caller into a LoST protocol query. The selective router interface translator also comprises an ALI to ERDB protocol translator to translate an ALI query for location of an emergency caller into an ERDB protocol query.

9 Claims, 6 Drawing Sheets

U.S. PATENT DOCUMENTS

| | | |
|---|---|---|
| 2003/0081752 A1 | 5/2003 | Trandal |
| 2003/0115261 A1 | 6/2003 | Mohammed |
| 2003/0125021 A1 | 7/2003 | Tell |
| 2003/0125493 A1 | 7/2003 | Phelan |
| 2003/0201931 A1 | 10/2003 | Durst |
| 2003/0222901 A1 | 12/2003 | Houck |
| 2004/0041729 A1 | 3/2004 | Rowitch |
| 2004/0043775 A1 | 3/2004 | Kennedy |
| 2004/0064500 A1 | 4/2004 | Kolar |
| 2004/0107143 A1 | 6/2004 | Niemi |
| 2004/0157175 A1 | 8/2004 | Matsumoto |
| 2004/0176123 A1 | 9/2004 | Chin |
| 2004/0181689 A1 | 9/2004 | Kiyoto |
| 2004/0203919 A1 | 10/2004 | Ross |
| 2004/0204847 A1 | 10/2004 | Yanai |
| 2005/0039135 A1 | 2/2005 | Othmer |
| 2005/0083923 A1 | 4/2005 | Kimata |
| 2005/0136885 A1 | 6/2005 | Kaltsukis |
| 2005/0148351 A1 | 7/2005 | Reding |
| 2005/0148353 A1 | 7/2005 | Hicks |
| 2005/0181805 A1 | 8/2005 | Gallagher |
| 2005/0186948 A1 | 8/2005 | Gallagher |
| 2005/0188078 A1 | 8/2005 | Kotzin |
| 2005/0195954 A1 | 9/2005 | Klein |
| 2005/0213537 A1 | 9/2005 | Ingimundarson |
| 2005/0265318 A1 | 12/2005 | Khartabil |
| 2005/0271051 A1 | 12/2005 | Holloway |
| 2005/0272424 A1 | 12/2005 | Gallagher |
| 2005/0272449 A1 | 12/2005 | Gallagher |
| 2005/0287979 A1 | 12/2005 | Rollender |
| 2005/0289097 A1 | 12/2005 | Trossen |
| 2006/0026288 A1 | 2/2006 | Acharya |
| 2006/0058049 A1 | 3/2006 | McLaughlin |
| 2006/0073812 A1 | 4/2006 | Punaganti |
| 2006/0079236 A1 | 4/2006 | Del Pino |
| 2006/0135177 A1 | 6/2006 | Winterbottom |
| 2006/0154665 A1 | 7/2006 | Svensson |
| 2006/0184617 A1 | 8/2006 | Nicholoas |
| 2006/0188083 A1 | 8/2006 | Breen |
| 2006/0189303 A1 | 8/2006 | Rollender |
| 2006/0205383 A1 | 9/2006 | Rollender |
| 2006/0236258 A1 | 10/2006 | Othmer |
| 2007/0003024 A1 | 1/2007 | Olivier |
| 2007/0008885 A1 | 1/2007 | Bonner |
| 2007/0022011 A1 | 1/2007 | Altberg |
| 2007/0027997 A1 | 2/2007 | Polk |
| 2007/0070980 A1 | 3/2007 | Phelps |
| 2007/0121601 A1 | 5/2007 | Kikinis |
| 2007/0162228 A1 | 7/2007 | Mitchell |
| 2007/0202844 A1 | 8/2007 | Wilson |
| 2007/0206568 A1 | 9/2007 | Silver |
| 2007/0206613 A1 | 9/2007 | Silver |
| 2007/0238448 A1 | 10/2007 | Gallagher |
| 2007/0242660 A1 | 10/2007 | Xu |
| 2007/0263610 A1 | 11/2007 | Mitchell |
| 2007/0293205 A1 | 12/2007 | Henderson |
| 2008/0037715 A1 | 2/2008 | Prozeniuk |
| 2008/0063153 A1 | 3/2008 | Krivorot |
| 2008/0065775 A1 | 3/2008 | Polk |
| 2008/0081646 A1 | 4/2008 | Morin |
| 2008/0117859 A1 | 5/2008 | Shahidi |
| 2008/0186164 A1 | 8/2008 | Emigh |
| 2008/0228926 A1 | 9/2008 | Shiratzky et al. |
| 2008/0253535 A1* | 10/2008 | Sherry et al. ................... 379/45 |
| 2008/0267172 A1 | 10/2008 | Hines |
| 2008/0273670 A1* | 11/2008 | Dickinson ................. 379/45 |
| 2009/0094270 A1* | 4/2009 | Alirez et al. ................. 707/102 |
| 2009/0129396 A1 | 5/2009 | Bakker |
| 2009/0237210 A1 | 9/2009 | Ciesla |
| 2009/0284348 A1 | 11/2009 | Pfeffer |
| 2010/0003954 A1 | 1/2010 | Greene |
| 2010/0142386 A1 | 6/2010 | Snapp |
| 2010/0272242 A1* | 10/2010 | Croy et al. ................... 379/45 |
| 2011/0149953 A1* | 6/2011 | Helgeson et al. ............. 370/352 |

OTHER PUBLICATIONS

International Search Report in PCT/US/2010/01938 dated Sep. 30, 2010.

* cited by examiner

EMERGENCY SERVICES SELECTIVE ROUTER INTERFACE TRANSLATOR

This application claims priority from U.S. Provisional Application No. 61/129,108, filed Jun. 5, 2008 entitled "Selective Router Interface Translation to Standard Protocols" to Todd Poremba, the entirety of which is explicitly incorporated herein by reference.

BACKGROUND OF THE INVENTION

1. Field of the Invention

This invention relates generally to emergency services. More particularly, it relates to selective router (a.k.a., 9-1-1 Tandem) protocol conversion to NENA 08-001 V8 or IETF location to service translation (LoST) protocol.

2. Background of the Related Art

In conventional emergency networks, a 9-1-1 call is placed, and forwarded by an end office to a 9-1-1 selective router. The selective router receives the call, and routes the call to a 9-1-1 trunk line to an associated public safety answering point (PSAP) appropriate for the current location of the caller.

Conventional selective routers define their own interfaces for querying databases for routing information. Developing standards specify a standard protocol for querying databases that store routing information.

FIG. 4A shows a conventional selective router operable to route an emergency call to a PSAP based on a current location of a caller obtained from a Location Information Server (LIS).

In particular, as shown in FIG. 4A, an end user device 10 places an emergency 9-1-1 call, which is routed to a legacy selective router 200 having a particular interface to an appropriate database to obtain the current location of the emergency caller 10, in this case we'll call it proprietary interface A to a Location Information System (LIS) 500. The LIS 500 provides a subscriber record that is typically the registered address (e.g., billing address) entered by the subscriber of the service when initially registering for wireline service. NOTE: A LIS may also have an interface to a service providers mobile environment so that queries for the location of a mobile user are determined at that moment of the emergency call.

FIG. 4B shows a conventional selective router operable to route an emergency call to a PSAP based on a current location of a caller obtained from an Emergency Routing DataBase (ERDB).

In particular, as shown in FIG. 4B, an end user device 11 places an emergency 9-1-1 call, this location serviced by a selective router 300 that has it's own method of obtaining a current location of the caller, e.g., to an Automatic Location Identification (ALI) server. The conventional ALI server provides a means of identifying a caller's address in an E911 emergency call.

Conventionally, companies that sell databases that store routing information also typically develop interfaces to permit the existing selective routers to query those databases.

SUMMARY OF THE INVENTION

In accordance with the principles of the present invention, a selective router interface translator comprises a NENA V3 protocol interface for communication with a location information server (LIS). A Location to Service Translation (LoST) protocol interface communicates with a LoST server. A NENA V3 protocol to LoST protocol translator translates a NENA V3 query for location of an emergency caller received over the NENA V3 protocol interface into a LoST protocol query for transmission over the LoST protocol interface.

In accordance with another aspect of the invention, a selective router interface translator comprises an automatic location identifier (ALI) interface for communication with an ALI. A NENA V8 protocol interface communicates with an Emergency Routing DataBase (ERDB). An ALI to ERDB protocol translator translates an ALI query for location of an emergency caller received over the ALI interface into an ERDB protocol query for transmission over the ERDB interface.

BRIEF DESCRIPTION OF THE DRAWINGS

Features and advantages of the present invention will become apparent to those skilled in the art from the following description with reference to the drawings.

DETAILED DESCRIPTION OF ILLUSTRATIVE EMBODIMENTS

The present inventor has appreciated in the context of selective routers that routing databases being planned today will only accept queries over a National Emergency Number Association (NENA) V8 interface, or using Location to Service Translation (LOST) protocol. The NENA V8 interface supports queries from a Voice Positioning Center (VPC) to an Emergency Routing DataBase (ERDB).

The present invention provides a selective router interface translator for placement between legacy selective routers and their location databases. In this way existing selective routers may remain as they are today, yet be flexible enough to allow the databases they query to be developed to new standards.

Figure 1:
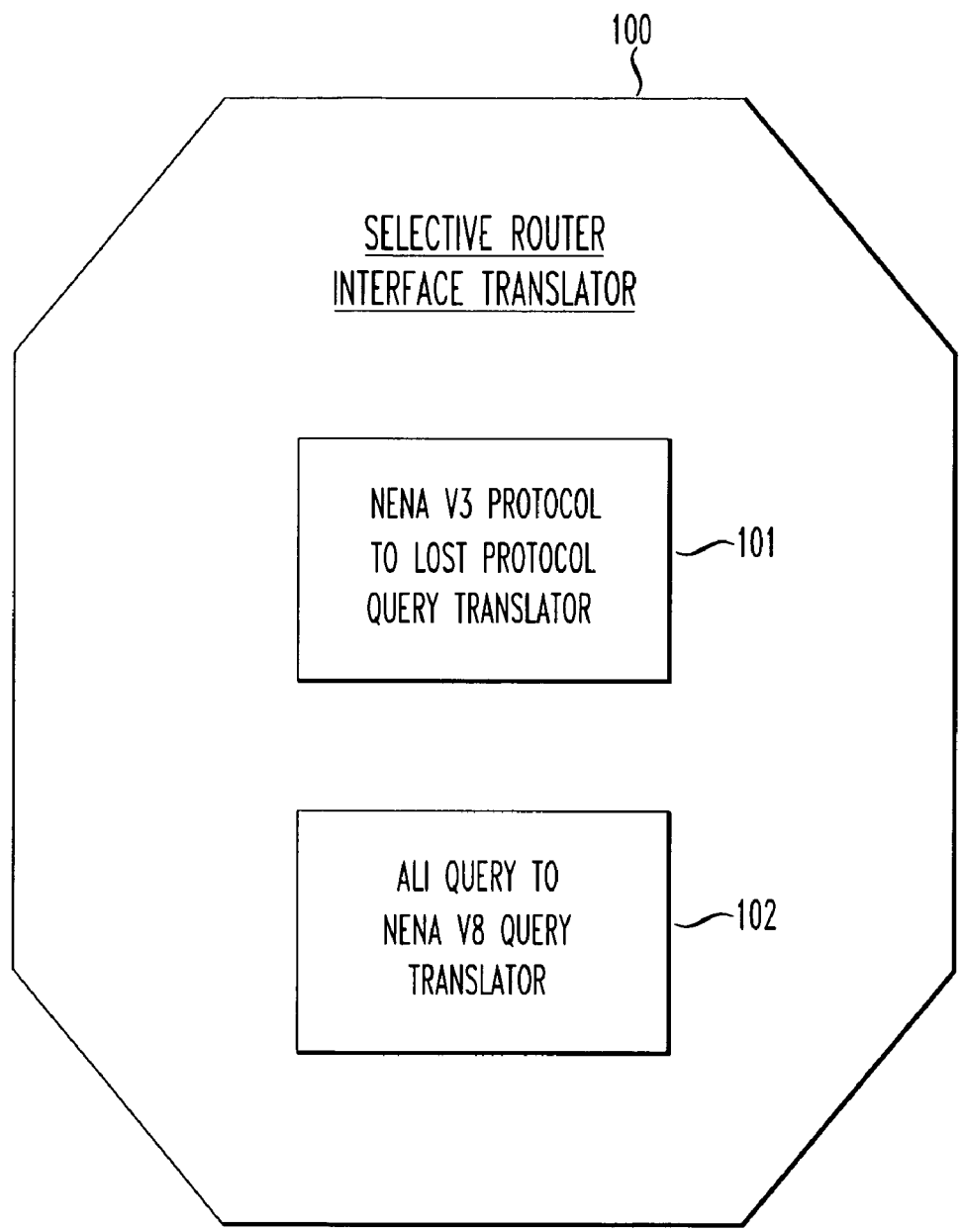
FIG. 1 depicts a selective router interface translator, in accordance with the principles of the present invention.

FIG. 1 depicts a selective router interface translator, in accordance with the principles of the present invention.

In particular, as shown in FIG. 1, a selective router interface translator 100 preferably includes a National Emergency Number Association (NENA) V3 protocol to Location to Service Translation (LoST) protocol query translator 101, and/or an Automatic Location Identification (ALI) query to NENA V8 protocol query translator 102.

Figure 2A:
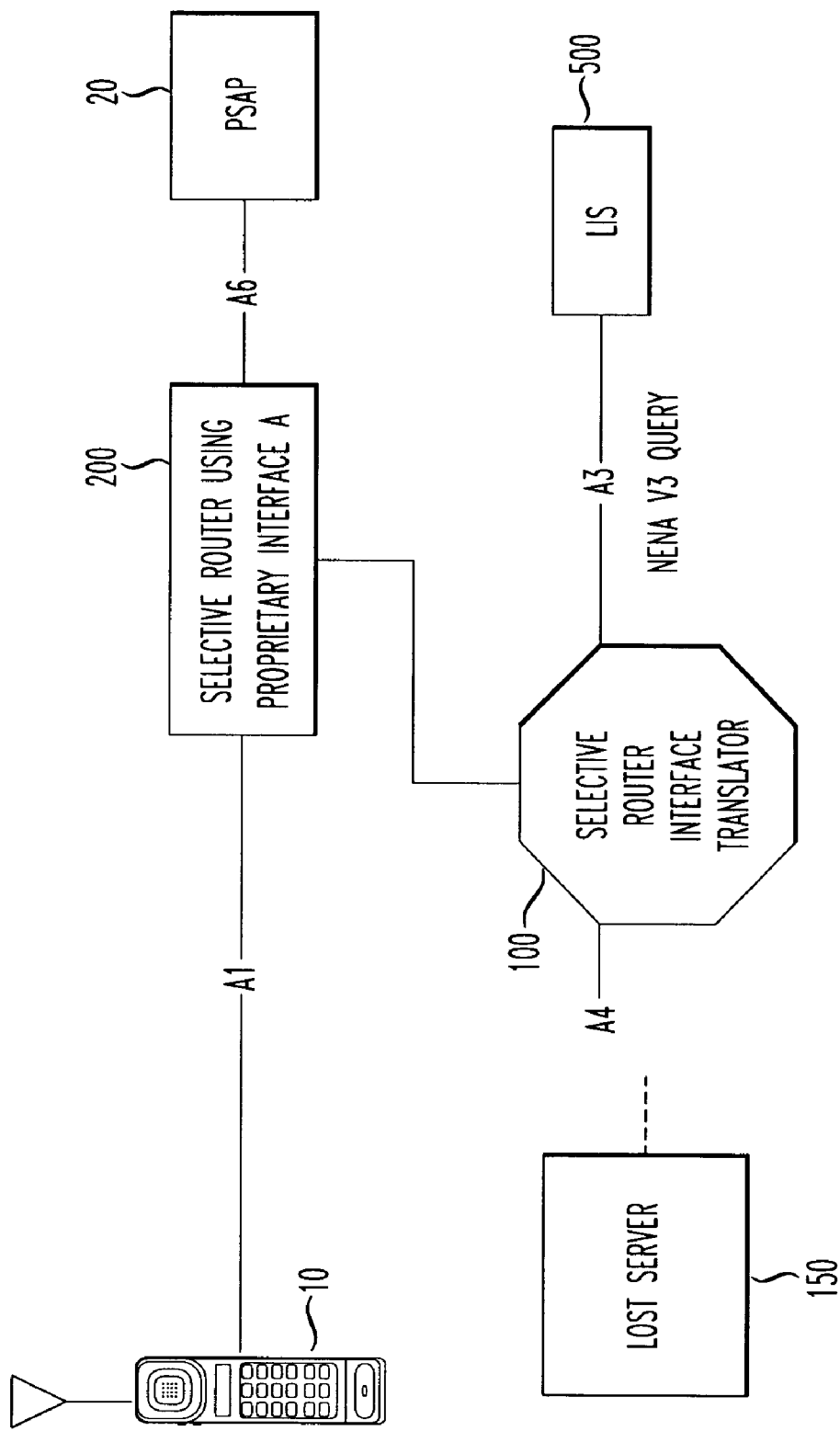
FIG. 2A shows a selective router interface translator in an emergency services network operable to route an emergency call to the proper public safety answering point (PSAP) based on a current location of the caller obtained from a Location to Service Translation (LOST) server via a location information server (LIS), in accordance with the principles of the present invention.

FIG. 2A shows a selective router interface translator in an emergency services network operable to route an emergency call to the proper public safety answering point (PSAP) based on a current location of the caller obtained from a location information server (LIS) via a Location to Service Translation (LOST) server, in accordance with the principles of the present invention. Location information is obtained from a LIS, while routing instructions are determined via a LoST server.

In particular, as shown in step A1 of FIG. 2A, an end user 10 dials "9-1-1" and their voice provider reaches the selective router 200 for their geographical area.

In step A2, the selective router 200 receives the telephone number (TN) of the emergency caller 10, and must look up the TN in an appropriate database to determine which egress trunk group from the selective router 200 to use to complete the emergency call between the emergency caller 10 and the appropriate public safety answering point (PSAP) 20.

In accordance with the invention, a telephone number query goes out the existing proprietary interface from the selective router 200 to a selective router interface translator 100.

In step A3, the selective router interface translator 100 receives the telephone number query from the selective router 200. The selective router interface translator 100 then queries the relevant database that stores location information associated with that telephone number. In this example of FIG. 2A, the relevant database that stores location information is a Location Information Server (LIS) 500 that is queried over a NENA V3 interface. In step A4, using the current location information received back from the LIS query of step A3, the selective router interface translator 100 forms an Internet Engineering Task Force (IETF) Location to Service Translation (LoST) protocol query to determine the appropriate routing for the selective router 200.

In step A5, the selective router interface translator 100 converts the routing information it receives from the IETF LoST query and converts it to the proprietary format used by the selective router 200 that originally queried.

In step A6, the selective router 200 receives a response to its query and is then able to select the appropriate circuit to complete the call between the emergency caller 10 and the appropriate PSAP 20 routed via the selective router 200.

Figure 2B:
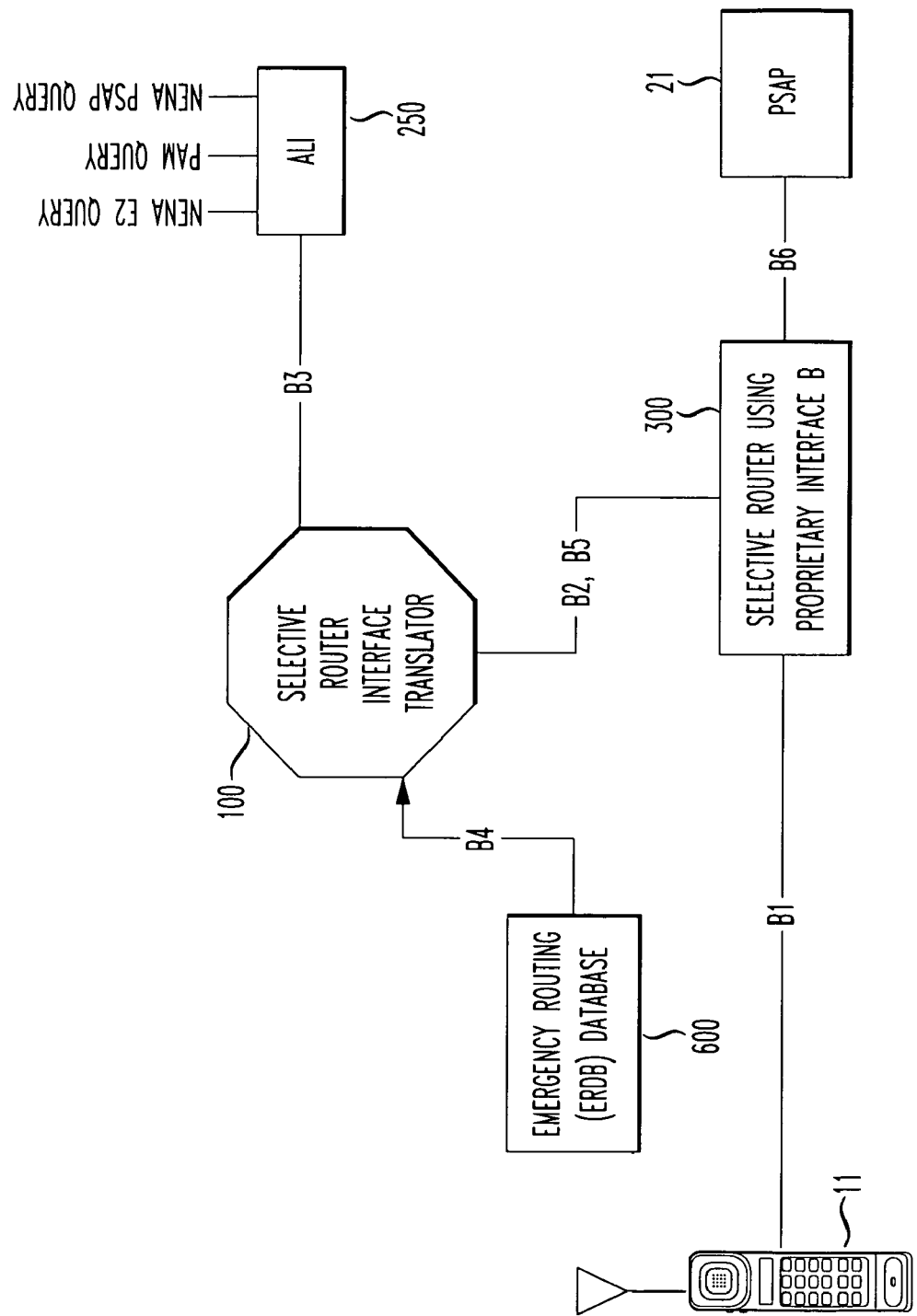
FIG. 2B shows a selective router interface translator in an emergency services network operable to route an emergency call to the proper public safety answering point (PSAP) based on a current location of the caller obtained from an automatic location information (ALI) server via an Emergency Routing DataBase (ERDB) server, in accordance with the principles of the present invention.

FIG. 2B shows a selective router interface translator in an emergency services network operable to route an emergency call to the proper public safety answering point (PSAP) based on a current location of the caller obtained from an automatic location information (ALI) server via an Emergency Routing DataBase (ERDB) server, in accordance with the principles of the present invention.

In particular, as shown in step B1 of FIG. 2B, an end user 11 dials "9-1-1" and their voice provider reaches the selective router 300 for their geographical area.

In step B2, the selective router 300 receives the telephone number (TN) of the emergency caller 11, and must look up the TN in an appropriate database to determine which egress trunk group from the selective router 300 to use to complete the emergency call between the emergency caller 11 and the appropriate public safety answering point (PSAP) 21.

In accordance with the invention, a telephone number query goes out the existing proprietary interface from the selective router 300 to a selective router interface translator 100.

In step B3, the selective router interface translator 100 receives the telephone number query from the selective router 300. The selective router interface translator 100 then queries the relevant database that stores location information associated with that telephone number. In this example of FIG. 2A, the relevant database that stores location information is an Automatic Location Information (ALI) server 250 that can be queried using NENA E2, PSAP-to-ALI Message (PAM) format, or NENA PSAP to ALI format (described in NENA 04-001).

In step B4, using the current location information received back from the ALI query of step B3, the selective router interface translator 100 forms a NENA V8 protocol query to an Emergency Routing DataBase (ERDB) 600 to determine the appropriate routing for the selective router 300. An Emergency Routing DataBase (ERDB) 600 is used during a 9-1-1 call to determine routing by providing routing instructions based on location rather than telephone number;

identifies the emergency services zone (ESZ)/Emergency Service Number (ESN) for the 9-1-1 call location (PSAP); and provides an MSAG Valid Address of the 9-1-1 caller.

In step B5, the selective router interface translator 100 converts the routing information it receives from the NENA V8 query and converts it to the proprietary format used by the selective router 300 that originally queried.

In step B6, the selective router 200 receives a response to its query and is then able to select the appropriate circuit to complete the call between the emergency caller 11 and the appropriate PSAP 21 routed via the selective router 300.

In this way, the present invention provides interaction of existing selective routers with a NENA 08-001 Emergency Routing Database (ERDB) or an IETF Location to Service Translation Server (LoST Server).

Figure 3:
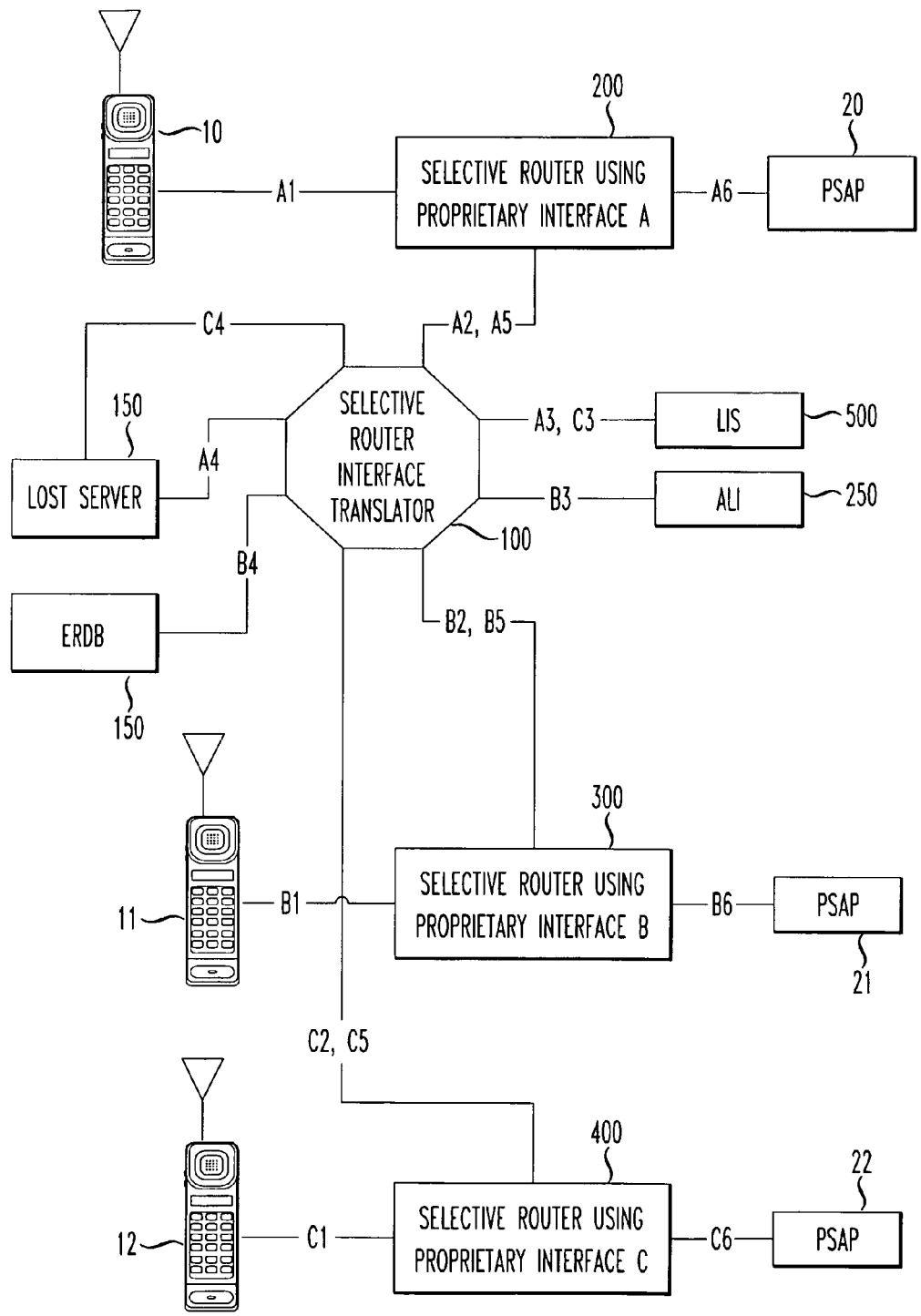
FIG. 3 shows a selective router interface translator in an emergency services network operable to route an emergency call to the proper public safety answering point (PSAP) based on a current location of the caller obtained from either an automatic location information (ALI) server or a Location Information Server (LIS) via either a Location to Service Translation (LoST) server or an Emergency Routing DataBase (ERDB) server, in accordance with the principles of the present invention.
Figure 4A:
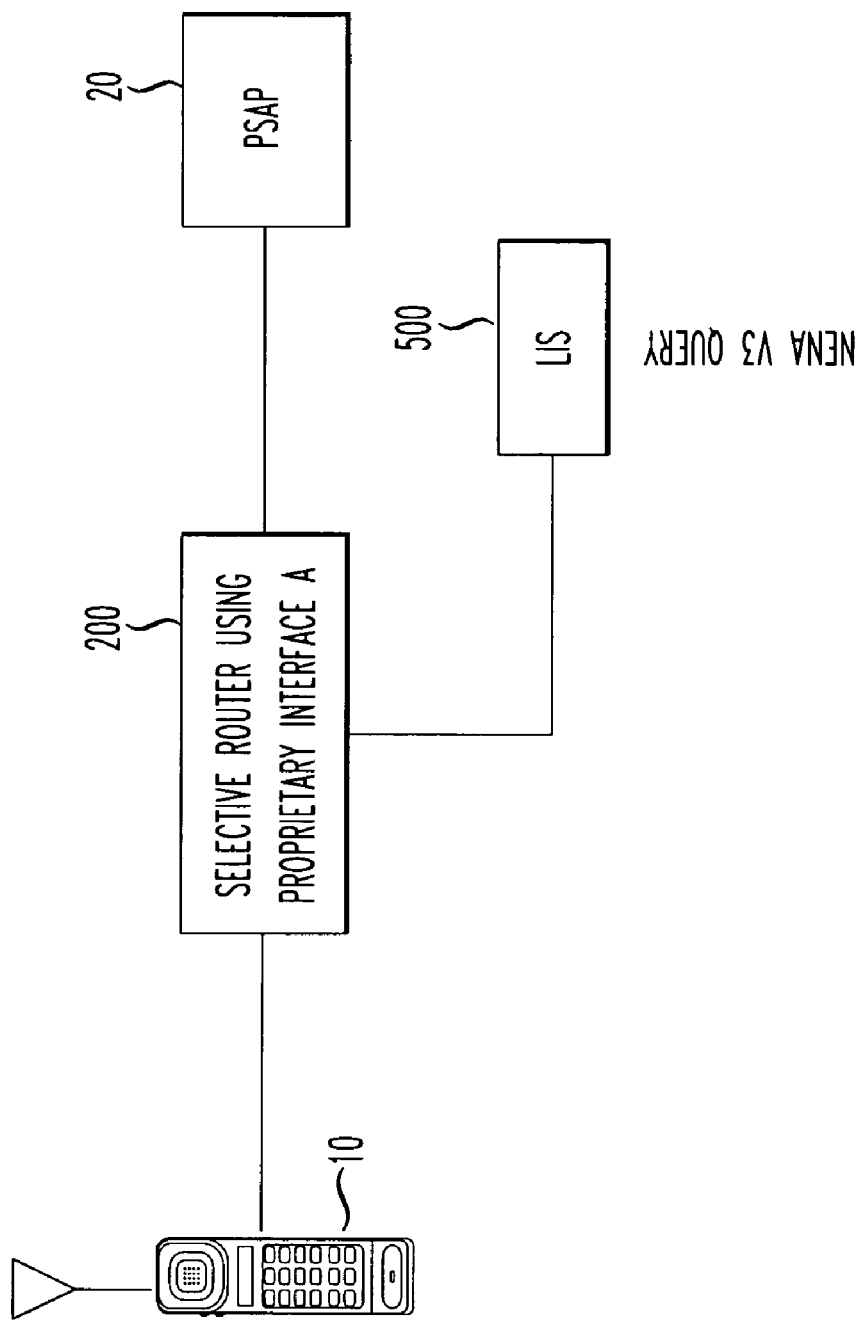
FIG. 4A shows a conventional selective router operable to route an emergency call to a PSAP based on a current location of a caller obtained from a Location Information Server (LIS).
Figure 4B:
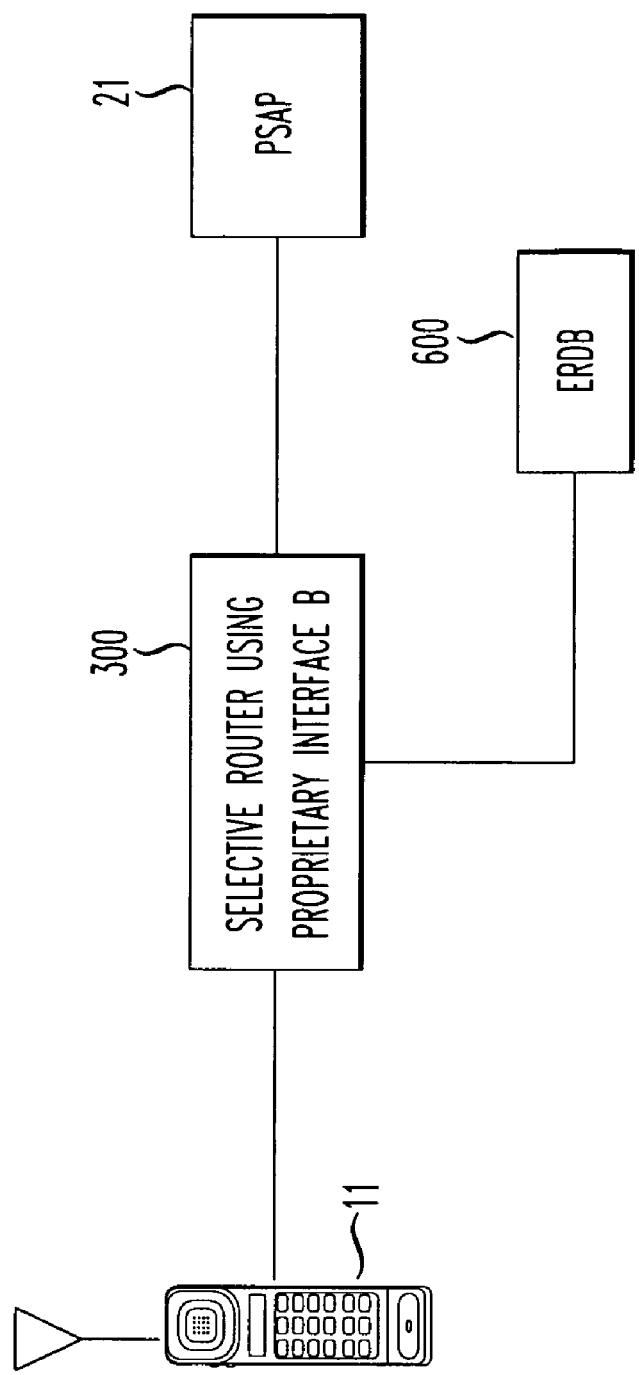
FIG. 4B shows a conventional selective router operable to route an emergency call to a PSAP based on a current location of a caller obtained from an Emergency Routing DataBase (ERDB).

FIG. 3 shows a selective router interface translator in an emergency services network operable to route an emergency call to the proper public safety answering point (PSAP) based on a current location of the caller obtained from either a Location Information Server (LIS) or an automatic location information (ALI) server via either a Location to Service Translation (LoST) server or an Emergency Routing DataBase (ERDB) server, in accordance with the principles of the present invention.

While FIGS. 2A and 2B show isolated examples of specific selective routers and their relevant location databases and interfaces thereto, FIG. 3 shows that the preferred selective router interface translator has the flexibility to be implemented with any of a plurality of different interface protocol types from respective selective routers. In particular, as shown in FIG. 3, exemplary messaging translation is provided between existing selective router interfaces 200, 300 and 400 to either a NENA V8 interface or an IETF LoST protocol interface, in accordance with the principles of the present invention.

The present invention has particular applicability by LECs and/or 9-1-1 service providers operating a selective router.

Those who would benefit from the invention include operators of current selective routers can adopt the newer routing databases without have to pay for or implement one of the newer protocols for querying a routing database. This extends the life of the current selective router infrastructure operated by local exchange carriers (LECs) and other 9-1-1 service providers.

While the invention has been described with reference to the exemplary embodiments thereof, those skilled in the art will be able to make various modifications to the described embodiments of the invention without departing from the true spirit and scope of the invention.

What is claimed is:

1. A selective router interface translator, comprising:
   a NENA V3 protocol interface for communication with a location information server (LIS);
   a Location to Service Translation (LoST) protocol interface for communication with a LoST server; and
   a NENA V3 protocol to LoST protocol translator to translate a NENA V3 query for location of an emergency caller received over said NENA V3 protocol interface into a LoST protocol query for transmission over said LoST protocol interface.

2. The selective router interface translator according to claim 1, further comprising:
   an automatic location identifier (ALI) interface for communication with an ALI;
   a NENA V8 protocol interface for communication with an Emergency Routing DataBase (ERDB); and
   an ALI to ERDB protocol translator to translate an ALI query for location of an emergency caller received over said ALI interface into an ERDB protocol query for transmission over said ERDB interface.

3. The selective router interface translator according to claim 2, wherein said ALI interface comprises:
   a NENA E2 protocol format interface.

4. The selective router interface translator according to claim 2, wherein said ALI interface comprises:
   a PSAP-to-ALI Message (PAM) protocol format interface.

5. The selective router interface translator according to claim 2, wherein said ALI interface comprises:
   a NENA Public Safety Answering Point (PSAP) to ALI protocol format interface.

6. A selective router interface translator, comprising:
   an automatic location identifier (ALI) interface for communication with an ALI;
   a NENA V8 protocol interface for communication with an Emergency Routing DataBase (ERDB); and
   an ALI to ERDB protocol translator to translate an ALI query for location of an emergency caller received over said ALI interface into an ERDB protocol query for transmission over said ERDB interface.

7. The selective router interface translator according to claim 6, wherein said ALI interface comprises:
   a NENA E2 protocol format interface.

8. The selective router interface translator according to claim 6, wherein said ALI interface comprises:
   a PSAP-to-ALI Message (PAM) protocol format interface.

9. The selective router interface translator according to claim 6, wherein said ALI interface comprises:
   a NENA Public Safety Answering Point (PSAP) to ALI protocol format interface.

* * * * *